United States Patent
Janani et al.

(10) Patent No.: US 8,090,042 B2
(45) Date of Patent: Jan. 3, 2012

(54) CHANNEL RANDOMIZATION AND TIME DIVERSITY FOR MIMO SYSTEM

(75) Inventors: Mohammad Janani, Plano, TX (US); Ahmadreza Hedayat, Allen, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 646 days.

(21) Appl. No.: 11/840,788

(22) Filed: Aug. 17, 2007

(65) Prior Publication Data

US 2008/0101437 A1 May 1, 2008

Related U.S. Application Data

(60) Provisional application No. 60/855,014, filed on Oct. 27, 2006.

(51) Int. Cl.
*H04B 7/02* (2006.01)
(52) U.S. Cl. ......... 375/267; 375/260; 375/299; 375/347
(58) Field of Classification Search ............... 375/267, 375/260, 299, 347, 349, 208, 280, 345, 334, 375/341, 318; 455/436, 69, 522, 562.1, 101, 455/90.2, 91
See application file for complete search history.

(56) References Cited

U.S. PATENT DOCUMENTS

| | | | |
|---|---|---|---|
| 7,194,042 B2 * | 3/2007 | Walton et al. ................. | 375/267 |
| 7,636,297 B1 * | 12/2009 | Lee et al. ...................... | 370/208 |
| 2005/0163245 A1 * | 7/2005 | Sandell ......................... | 375/267 |
| 2005/0190715 A1 | 9/2005 | McNamara | |
| 2006/0209978 A1 * | 9/2006 | Jungnickel et al. ........... | 375/267 |
| 2007/0071147 A1 * | 3/2007 | Sampath et al. .............. | 375/347 |
| 2007/0150928 A1 * | 6/2007 | Hottinen ....................... | 725/127 |
| 2008/0043860 A1 * | 2/2008 | Moffatt ......................... | 375/260 |

OTHER PUBLICATIONS

PCT International Search Report and Written Opinion of the International Searching Authority, Feb. 7, 2008.

\* cited by examiner

*Primary Examiner* — Kabir A Timory

(57) ABSTRACT

A method is provided for creating an artificial a fast fading channel in a MIMO communication system. The method includes encoding a series of source data to generate a first plurality of encoded output signals and multiplying the first plurality of encoded output signals by a plurality of random complex numbers to generate a second plurality of encoded output signals, and transmitting the second plurality of encoded output signals via the corresponding plurality of antennas. The transmitted signals vary in time and frequency independent of the channel conditions.

17 Claims, 3 Drawing Sheets

CHANNEL RANDOMIZATION AND TIME DIVERSITY FOR MIMO SYSTEM

CROSS REFERENCES TO RELATED APPLICATIONS

This application claims the benefits of U.S. Patent Application Ser. No. 60/855,014, which was filed on Oct. 27, 2006.

BACKGROUND OF THE INVENTION

The present disclosure generally relates to a method for improving the performance of communication systems, and more particularly to a method for artificially changing the quasi-static channel fading to time-varying channel fading condition by multiplying the transmitting signals with a set of time varying complex multipliers to improve the performance of the communication systems.

In communication systems, the term 'fading' generally refers to a degradation of the received signals over time caused by changes in the transmission medium or path. Fading generally results from the superposition of multiple copies of transmitted signals that have experienced attenuation, delay and phase shift while traveling from a source to a receiver. It may also be caused by attenuation of signals.

Multipath fading or small-scale fading is a kind of fading occurring with small movements of a mobile or obstacle. For example, cellular phones may experience momentary fading of receiving signals and the reason for the degradation of signals is the destructive interference that multiple reflected copies of the signal overlapped with itself. The way to cope with fading is to ensure that multiple versions of the same signal are transmitted, received, and coherently combined. This is usually termed diversity, and is sometimes acquired through multiple antennas.

A channel model describing the fading phenomenon is represented by an equation which describes the relationship between the receiving signal and transmitting signal. The receiving signal is the sum of transmitting signal multiplied with a set of time-dependent coefficients and time-varying random noise. The set of time-dependent coefficients is modeled as random variables.

In communication systems, the performance can be improved if a data packet experiences a time-varying nature of the radio channel. This is simply due to the fact that a radio channel with time-varying channel characteristic could have lower bit error rate than a radio channel with quasi-static channel characteristic in a long run. If the radio channel is operated in a time-varying multi-path fading environment, the channel coding schemes among other methods can improve the performance of the communication systems.

If the channel characteristic is not time-varying, such as in quasi-static fading condition, even channel coding schemes can not recover bit errors caused by the impairment of the radio environment because the data packet experiences same type of bit errors. Quasi-static fading channel model is the one in which channel coefficients in the channel model remain constant for at least one data packet interval. If a channel has channel coefficients staying the same for more than one data packet but less than a frame, it is called block fading channel.

Accordingly, it is desirable to provide methods for artificially changing the quasi-static fading channel to time-varying fading channel to improve the performance of the channel codes by artificially creating time-varying transmitting signals to provide time diversity. Furthermore, other desirable features and characteristics of the techniques described herein will become apparent from the subsequent detailed description and the appended claims, taken in conjunction with the accompanying drawings and the foregoing technical field and background.

SUMMARY OF THE INVENTION

In view of the foregoing, the techniques described herein relate to a method that is applicable to any MIMO digital communication systems. Embodiments described herein improve the performance of the communication systems by providing time-diversity to relatively static channel conditions, such as quasi-static fading or block fading channel models.

According to example embodiments described herein, a method that can improve the performance of the multiple-input multiple output (MIMO) antenna systems, orthogonal frequency division multiplexing (OFDM) system, or orthogonal frequency division multiple access (OFDMA) system using channel randomizer coefficients at the transmitter is described. Embodiments described herein are different from those of the conventional methods in that they are not limited to uplink or downlink only and each base station can perform the proposed methods regardless of other base stations. With the techniques are implemented, gain and performance improvements for the multi-path fading are achieved, which is not available in such conventional method as random phase-hopping at the transmitter.

In accordance with an example embodiment, a method for providing a fast fading channel in a MIMO communication system is disclosed. The method includes encoding a series of source data to generate a first plurality of encoded output signals and multiplying the first plurality of encoded output signals by a plurality of random complex numbers to generate a second plurality of encoded output signals. The method further includes transmitting the second plurality of encoded output signals via the corresponding plurality of antennas, wherein the transmitting signals vary in time and frequency independent of the channel conditions.

Embodiments described herein can be applied to a variety of channel codes using MIMO systems with or without OFDM/OFDMA transmission. Time diversity can be easily obtained by the use of simple time varying complex multipliers. With the randomizing sequence known at a receiver, it will not incur extra load to estimate the channel coefficients at the receiver.

The features and advantages described in the specification are not all inclusive, and particularly, many additional features and advantages will be apparent to one of ordinary skill in the art in view of the drawings, specification, and claims hereof. The construction and method of operation, together with additional objects and advantages thereof will be best understood form the following description of specific embodiments when read in connection with the accompanying drawings.

BRIEF DESCRIPTION OF THE DRAWINGS

A more complete understanding of the techniques used herein may be described by referring to the detailed description and claims when considered in conjunction with the following figures, wherein like reference numbers refer to similar elements throughout the figures.

DETAILED DESCRIPTION OF THE INVENTION

Figure 1:
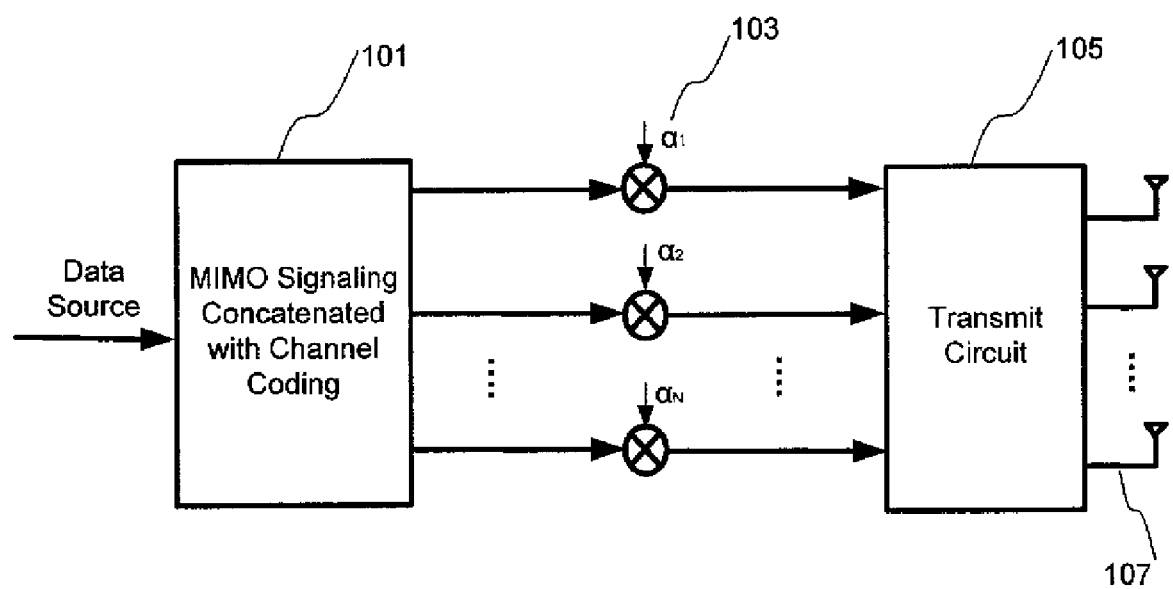
FIG. 1 is a simplified diagram illustrating a channel randomization technique for a general multiple antenna system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The techniques described herein relate to a method for improving the performance of communication systems, and more particularly to a method for artificially changing the quasi-static fading channel to time-varying fading channel to improve the performance of the communication systems by artificially creating time diversity.

Fading or fading channel refers to mathematical models for the distortion that a carrier-modulated telecommunication signal experiences over certain propagation media. The most common types of fading include slow fading and fast fading. The multipath signals of a wireless channel vary at two spatial scales: large-scale fading and small-scale fading. As applied to a mobile radio environment, slow fading or large-scale fading is a kind of fading caused by larger movements of a mobile station or obstructions within the propagation environment. In free space, the power of radio signal attenuates proportional to $1/r^2$ where "r" represents a distance between the source and the destination, the receiving power can attenuate even more rapidly with distance and obstructions. Fast fading refers to a small-scale multipath fading, which is a kind of fading occurring with small movements of a mobile station or obstacle. Multipath fading is due to constructive and destructive interference of the transmitted waves.

As further described below, the techniques described herein can be applied to any MIMO digital communication systems. The objective is to improve the performance of the communication system by providing time diversity to relatively static channels such as quasi-static fading channel or block fading channel. Quasi-static fading channel model is one in which fading coefficients remain constant for at least one data packet interval.

A block fading channel is a channel in which the channel characteristics are fixed over constant-sized blocks. If the channel coefficients stay the same for more than one data packet interval but less than a frame, it is deemed a block fading channel.

Generally, a output of a block fading channel is described according to the following equation: $Y_{ij}=S_i X_{ij}+N_{ij}$, where $X_{ij}$ and $Y_{ij}$ each represents the ith channel input and channel output, respectively, in the jth block, the channel coefficient S represents the fading amplitudes, where $S_i$ is an independent random variable, and $N_{ij}$ represents random noise at the ith channel and jth block. As indicated above in the equation, the channel output $Y_{ij}$ is the sum of the channel input $S_i X_{ij}$ and the noise $N_{ij}$. The noise $N_i$, is assumed to be independent of the signal $S_i X_{ij}$ and if the variance of the random noise is zero, then the receiver receives the transmitted signal perfectly.

FIG. 1 is a simplified diagram illustrating a channel randomization technique for a general multiple antennas system. As illustrated in FIG. 1, the source data is first encoded by a MIMO channel encoder 101, which has a general structure and could possibly be a concatenation of a channel code and a MIMO signaling scheme, such as space-time code, spatial multiplexing, or beam-forming. Each of the outputs from the MIMO encoder 101 is multiplied at stage 103 by a pseudo-random complex number such that each output signal has its own randomized amplitude and phase generated by multiplying the encoded signal with the corresponding randomizing coefficients $\alpha_i$ before being transmitted. The resulting output signals are fed into the transmit circuits 105 before being transmitted by N different antennas 107.

At the receiving station, all signals transmitted from the N different antennas are received by M receiving antennas. Due to the presence of the randomizing coefficients $\alpha_i$ (i=1, 2, . . . n), the effective channel coefficient will be the actual channel coefficient multiplied by the corresponding randomizing coefficients $\alpha_i$. Since the randomizing channel coefficients $\alpha_i$ change faster than the channel characteristic of the radio channel does, an artificial fast fading channel is obtained. Any type of modulation scheme like PSK, QAM or OFDM may be used as long as the modulated signal is multiplied by a pseudo-random complex scalar before being transmitted.

The channel coefficients $\alpha_i$ are complex values and pseudo-randomly selected at each transmission time. The sequence of $\alpha_i$ for a frame could be known at the receiver or unknown to the receiver. In the latter case, the receiver estimates the effective channel coefficients which are multiplied by the channel randomizing coefficients $\alpha_i$. It should be noted that the receiver can track the collective channel coefficients and the channel randomizing coefficients through embedded pilot signals. Care must be taken so that the pilot signals may track the effective channel change without harming the performance of the communication system.

The output power at each transmit antenna may change at each transmission time. The phase of each complex channel randomizing coefficients $\alpha_i$ will change the phase of the output signal at each transmit antenna, while the magnitude of each complex channel randomizing coefficient $\alpha_i$ will change the output power for each antenna at each transmission time. Generally, there is a limit for the maximum output power which must be considered to determine the channel randomizing coefficient $\alpha_i$. However, in many applications, the transmitter is not working at its maximum power and there is a gap between the working power and the peak power. Thus, an average transmit power can be set so as not to exceed that average power goal.

As described above, each of the actual channel coefficients is multiplied by the corresponding channel randomizing coefficients $\alpha_i$ to form a equivalent time-varying fast fading channel. This method can be used in different channel scenarios regardless of whether each channel is known, unknown, or partially known.

Figure 2:
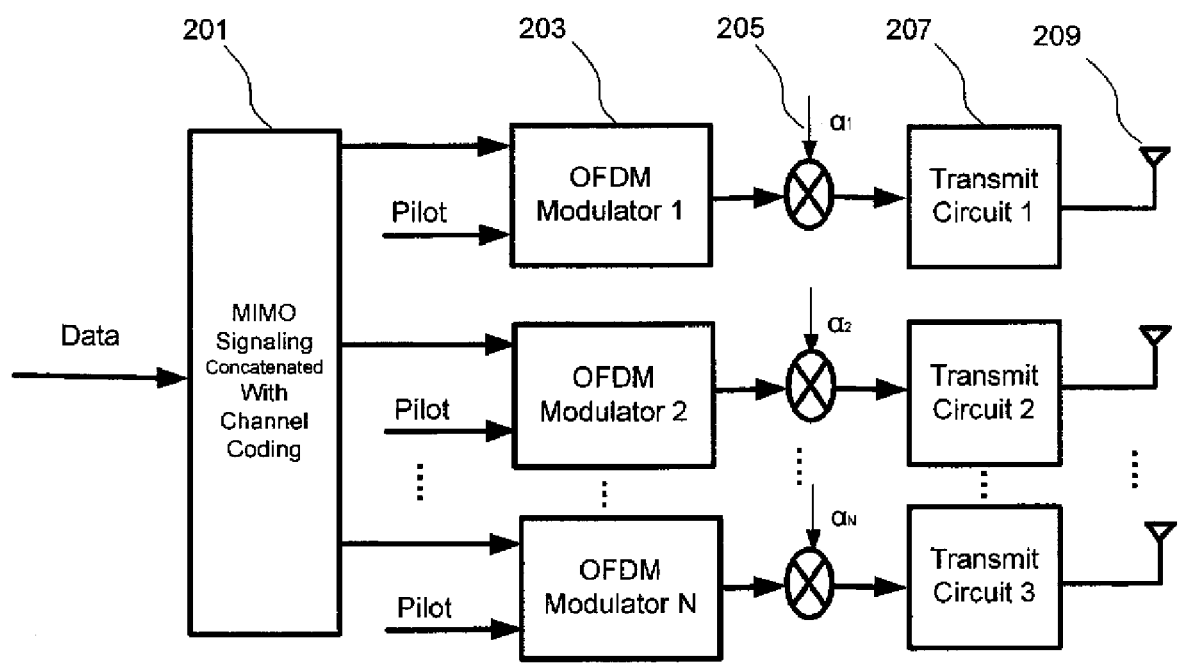
FIG. 2 is a simplified diagram illustrating a channel randomization for a multiple antenna system after OFDM modulation.

Embodiments described herein can be applied to systems using Orthogonal Frequency-Division Multiplexing (OFDM) as well, as illustrated in FIG. 2. OFDM is a digital multi-carrier modulation scheme, which uses a large number of closely-spaced orthogonal subcarriers. Orthogonal Frequency Division Multiple Access (OFDMA) is a multi-user version of the popular OFDM digital modulation scheme.

FIG. 2 is a simplified diagram illustrating a channel randomization for a multiple antenna system after OFDM modulation. In FIG. 2, a similar technique described with reference to FIG. 1 is applied to systems using OFDM modulation scheme. After being encoded by MIMO encoder 201, which has the same general structure of 101 (FIG. 1), and modulated by OFDM modulators 203, each OFDM signal is multiplied at stage 205 by a randomizing complex number coefficients $\alpha_i$ such that each channel has a time-varying amplitude and phase. The resulting outputs are fed into the transmit circuits 207 before being transmitted by N different antennas 209.

Figure 3:
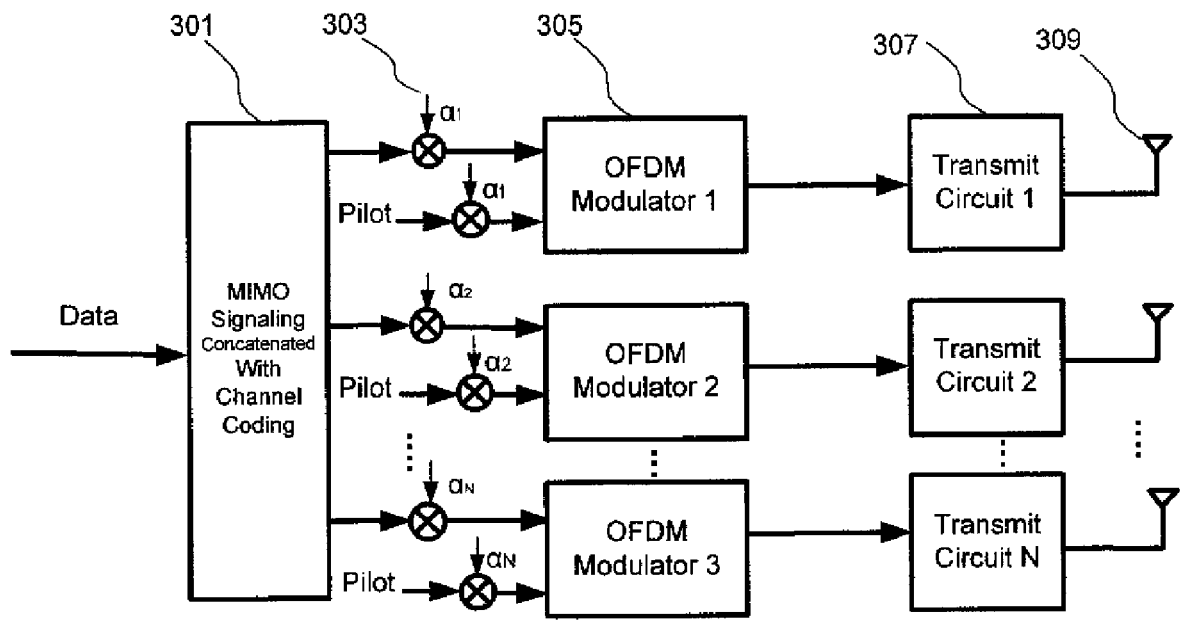
FIG. 3 is a simplified diagram illustrating a channel randomization for a multiple antenna system before OFDM modulation.

FIG. 3 is a simplified diagram illustrating a channel randomization for a multiple antenna system before OFDM modulation. In FIG. 3, a similar technique described with reference to FIG. 1 or FIG. 2 is applied to systems using an OFDM modulation scheme. After being encoded by MIMO encoder 301, which has the same general structure of 101 (FIG. 1), each encoded signal is multiplied at stage 303 by a randomizing complex vector coefficients $\alpha_i$ such that each channel has a varying amplitude and phase. The resulting outputs are fed into OFDM modulators 305 and transmit circuits 307 before being transmitted by N different antennas 309.

FIG. 3 illustrates an embodiment in which fast-fading is achieved inside the OFDM symbols, which is particularly useful when a part of the coded frame is located in one OFDMA symbol used in such application as WiMAX. By this way, sub-carriers inside OFDM symbols can be changed to provide faster fading varying channel characteristic over time and frequency. It is noted that in FIG. 3 each of $\alpha_i$ is a vector whose size is up to the number of tones in the OFDM/OFDMA modulator, and each vector of $\alpha_i$ can be further changed based on some time basis. Hence, the proposed channel randomizing technique will provide an artificial frequency-varying channel condition in addition to the time-varying channel condition. Also $\alpha_i$ has a general form and could vary from tone to tone, or for a subset of the tones might have the same value, and for another subset of the tones might have a different value.

While at least one example embodiment has been presented in the foregoing detailed description, it should be appreciated that a vast number of variations exist. It should also be appreciated that the embodiments described herein are only examples, and are not intended to limit the scope, applicability, or configuration of the techniques described herein in any way. Rather, the foregoing detailed description will provide those skilled in the art with a convenient road map for implementing the example embodiments. It should be understood that various changes can be made in the function and arrangement of elements without departing from the scope of the techniques described herein as set forth in the appended claims and the legal equivalents thereof.

What is claimed is:

1. A method comprising:
   at a multiple-input multiple-output (MIMO) communication device having a plurality of antennas and configured to send MIMO transmissions over a wireless channel, encoding a series of source data using a MIMO channel encoder to generate a plurality of encoded output signals;
   generating a plurality of pseudo-random complex numbers that are independent of conditions of the wireless channel and that are configured to vary over time faster than a channel characteristic of the wireless channel in order to produce an artificial fast fading wireless channel;
   multiplying corresponding ones of the plurality of encoded output signals by corresponding ones of the plurality of pseudo-random complex numbers to generate a plurality of transmit signals for transmission via a corresponding antenna of the plurality of antennas, wherein the plurality of pseudo-random complex numbers are configured to vary the amplitude and phase of the plurality of encoded output signals so as to form the artificial fast-fading wireless channel when transmitted via the plurality of antennas; and
   transmitting the plurality of transmit signals via the plurality of antennas.

2. The method of claim 1, wherein generating comprises generating the plurality of pseudo-random complex numbers that are configured to randomize the transmit signals and to provide time diversity to the wireless channel when the wireless channel has relatively static channel conditions.

3. The method of claim 1, further comprising modulating the plurality of encoded output signals before multiplying by the plurality of pseudo-random complex numbers.

4. The method of claim 3, further comprising modulating the plurality of encoded output signals using Phase Shift Keying (PSK), Quadrature Amplitude Modulation (QAM) or Orthogonal Frequency Division Multiplexing (OFDM) modulation techniques.

5. The method of claim 1, wherein generating comprises generating the plurality of pseudo-random complex numbers at each transmission time.

6. The method of claim 5, wherein generating comprises generating the plurality of pseudo-random complex numbers that are configured to provide a fast time-varying channel condition.

7. The method of claim 1, further comprising embedding information representing the plurality of pseudo-random complex numbers within the transmit signals.

8. The method of claim 1, wherein generating comprises generating the plurality of pseudo-random complex numbers such that the output power of the transmit signals conforms to a transmit power level constraint.

9. A method comprising:
   at a multiple-input multiple-output (MIMO) communication device having a plurality of antennas and configured to send MIMO transmissions over a wireless channel, encoding a series of source data using a MIMO channel encoder to generate a plurality of encoded output signals;
   modulating the plurality of encoded output signals to generate a first plurality of orthogonal frequency division multiplexed (OFDM) modulated signals; generating a plurality of pseudo-random complex numbers that are independent of conditions of the wireless channel and that are configured to vary over time faster than a channel characteristic of the wireless channel in order to produce an artificial fast fading wireless channel;
   multiplying corresponding ones of the first plurality of OFDM modulated signals by corresponding ones of the plurality of pseudo-random complex numbers to generate a second plurality of OFDM modulated signals for transmission via a corresponding antenna of the plurality of antennas, wherein the plurality pseudo-random complex numbers are configured to vary the amplitude and phase of the first plurality of OFDM modulated signals so as to form the artificial fast-fading wireless channel when transmitted via the plurality of antennas; and
   transmitting the second plurality of OFDM modulated signals via the plurality of antennas.

10. The method of claim 9, wherein generating comprises generating the plurality of pseudo-random complex numbers that are configured to randomize the second plurality of OFDM modulated signals and to provide time diversity to the wireless channel when the wireless channel has relatively static channel conditions.

11. The method of claim 9, wherein generating comprises generating the plurality of pseudo-random complex numbers at each transmission time.

12. A method comprising:
   at a multiple-input multiple-output (MIMO) communication device having a plurality of antennas and configured to send MIMO transmissions over a wireless channel, encoding a series of source data using a MIMO channel encoder to generate a first plurality of encoded output signals;

generating a plurality of complex vectors comprising pseudo-random complex numbers such that the complex vectors are independent of conditions of the wireless channel and that are configured to vary over time faster than a channel characteristic of the wireless channel in order to produce an artificial fast fading wireless channel, wherein each complex vector comprises a plurality of pseudo-random complex numbers up to a number of subcarriers used when modulating the source data;

multiplying corresponding ones of the first plurality of encoded output signals by corresponding ones of the plurality of complex vectors to generate a second plurality of encoded output signals for transmission via a corresponding antenna of the plurality of antennas, wherein the plurality of complex vectors are configured to vary the amplitude and phase of the first plurality of encoded output signals so as to form the artificial small-scale multipath fading wireless channel when transmitted via a plurality of antennas in order to provide time diversity to the wireless channel;

modulating the second plurality of encoded output signals to provide a plurality of modulated signals; and transmitting the second plurality of modulated signals via the plurality of antennas.

13. The method of claim 12, wherein generating comprises generating the plurality of pseudo-random complex numbers that are configured to randomize the second plurality of encoded output signals.

14. The method of claim 12, wherein modulating comprises modulating the second plurality of encoded output signals using Phase Shift Keying (PSK), Quadrature Amplitude Modulation (QAM) or Orthogonal Frequency Division Multiplexing (OFDM) modulation techniques.

15. The method of claim 12, wherein generating comprises generating the plurality of random complex numbers at each transmission time.

16. The method of claim 15, wherein generating comprises generating the plurality of pseudo-random complex numbers that are configured to provide a fast time-varying channel condition.

17. The method of claim 12, further comprising:
generating a number of pilot signals corresponding to a number of the plurality of antennas; and
multiplying corresponding ones of the pilot signals by corresponding ones of the plurality of complex vectors to generate a third plurality of encoded output signals for transmission via corresponding ones of the plurality of antennas.

* * * * *